Jan. 6, 1959     A. A. POLLIA     2,867,454
AXIALLY BOLTED PIPE COUPLING WITH KEYED FLANGES
Filed April 3, 1956

INVENTOR.
Andrew A. Pollia.
BY
A. Schapp.
ATTORNEY

United States Patent Office 2,867,454
Patented Jan. 6, 1959

2,867,454

AXIALLY BOLTED PIPE COUPLING WITH KEYED FLANGES

Andrew A. Pollia, San Francisco, Calif.

Application April 3, 1956, Serial No. 575,815

4 Claims. (Cl. 285—368)

The present invention relates to improvements in pipe couplings, and contemplates further improvements in the pipe coupling described and claimed in my co-pending application, Serial Number 343,440.

The principal object of the present invention is to provide a coupling of the character described which is simple in construction, comprises relatively few parts, and which may be readily applied in the field, with the aid of simple tools.

Another object of my invention is to provide a coupling of the character described which does not require any special pre-cutting or pre-forming of the pipe sections to be joined at the factory.

It is still further proposed to provide a pipe coupling of the character described which has a certain degree of flexibility to yield to bending stresses without affecting the seal between the pipe sections, and in which each pipe section in a pipe line is capable of turning movement with respect to the other sections, which qualifications are particularly useful in case of earthquakes or other earth movements, sudden shocks or internal stresses.

Further objects and advantages of my invention will appear as the specification proceeds, and the new and useful features of my coupling will be fully defined in the claims hereto attached.

Figure 1:
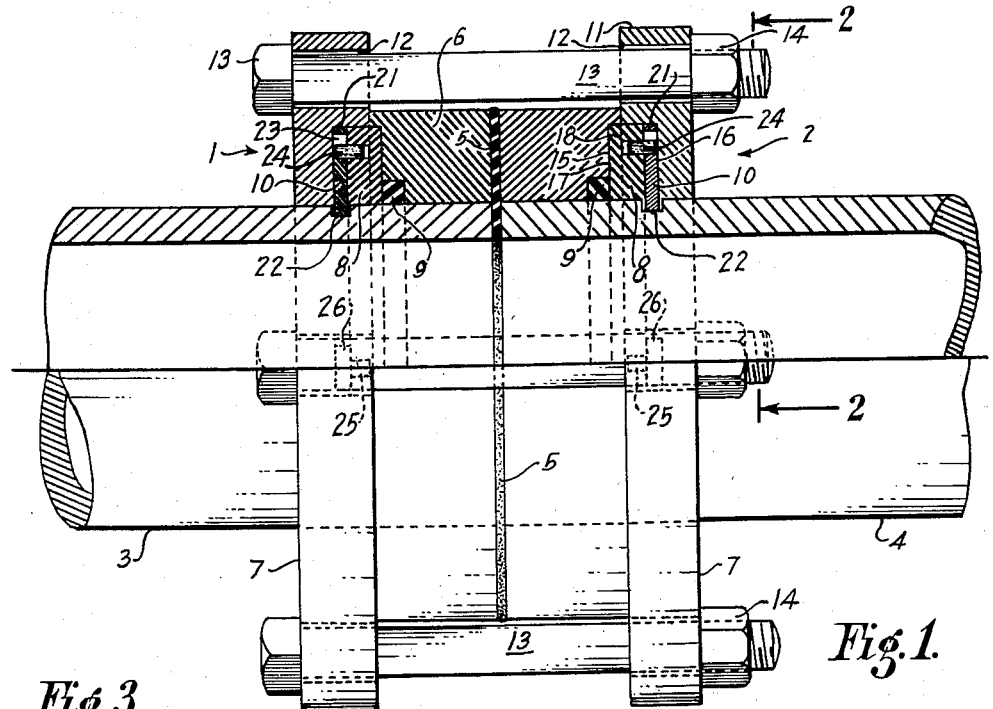
Figure 2:
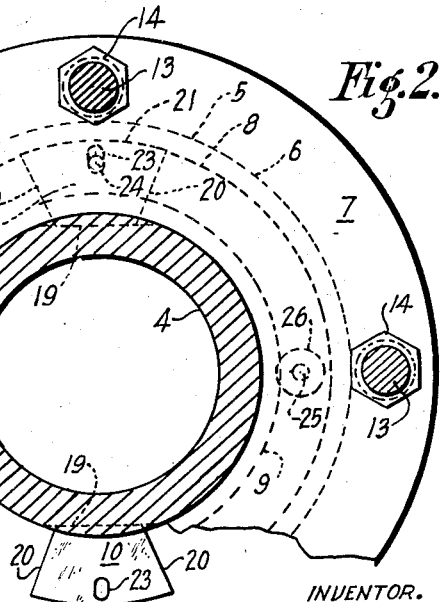

The preferred form of my invention is illustrated in the accompanying drawing, forming part of this application, in which:

Figure 1 shows a side view of my pipe coupling as applied to a pair of pipe sections, a portion being shown in central section;

Figure 2, a section taken along line 2—2 of Figure 1; and

Figure 3:
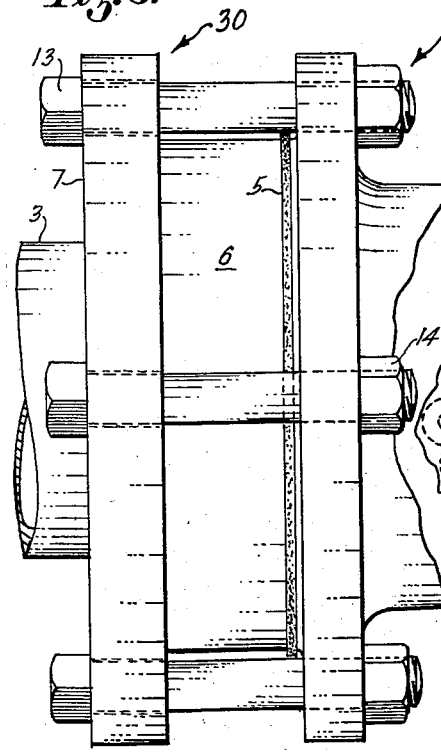

Figure 3, a side view of one unit of my coupling as applied to a standard pre-existing unit.

While I have shown only the preferred form of my invention, it should be understood that various changes or modifications may be made within the scope of the claims hereto attached, without departing from the spirit of the invention.

Referring to the drawing in detail, Figure 1 shows my coupling as comprising two units 1 and 2 applied to the two pipe sections 3 and 4, respectively, the pipe sections being arranged in confronting relation and spaced to accommodate the flange washer 5 between the same.

Each unit comprises, in its principal parts, a hub 6 fitting upon the end of its pipe section, a flange 7 bearing upon the rear end of the hub, a ring 8 interposed between the hub and the flange, a packing 9 bearing upon the front face of the ring adjacent the pipe section, and a plurality of keys 10 locking the ring to the pipe section.

The hub 6 is of sufficient axial length for suitably spacing the locking means from the end of the pipe section, and is of considerable thickness, as shown, preferably twice the thickness of that of the pipe wall.

The flange 7 is cylindrical in form and has a rim 11 projecting beyond the circumference of the hub, the two rims of the two units being formed with registering holes 12 adapted to receive bolts 13 by means of which the two units may be drawn toward one another for drawing the pipe sections and the hubs upon the interposed flange washer 5, the outer periphery of which registers with the outer peripheries of the hubs.

It will be noted that the hubs are dimensioned, as compared with the flanges, to bring the bolts into close proximity to the hubs. The bolts are tightened upon the flanges by nuts 14 and are of considerable length, which allows of greater flexibility in alining the sections.

The hub and the flanges are formed with registering annular recesses 15 and 16 defining an annular chamber 17 between the same, the chamber being rectangular in cross-section. A ring 18 is mounted in the chamber, adjacent the pipe section, and has a front face in contact with the hub 6 and a rear face spaced from the flange sufficiently to accommodate the keys 10.

Each key is segmental in shape, as shown in Figure 2, with a flat bottom edge 19, radiating side edges 20 and a circular top edge 21, the latter being drawn to a diameter corresponding to that of the ring 8 when the key is positioned properly.

The bottom edge of the key is anchored to the pipe section by engagement in a transverse groove 22 cut into the pipe section. The portion of the key projecting from the groove may be approximately five times as large as that confined in the groove.

The groove has a flat bottom registering with the bottom of the key, and the groove may be readily cut into the pipe material in the field. In the preferred method of carrying out my invention, I provide a suitable template for this operation, consisting of a cap which may be pushed over the end of the pipe section and which is formed with a transverse slot at the proper spacing from its end, so that the slot may be used as a guide for the hack saw.

The grooves are preferably made slightly wider than the width of the keys to allow of a certain degree of flexibility.

The key is held against turning movement by means of a radial slot 23 in the key fitting over a pin 24 projecting from the rear face of the ring 8, the slot allowing the same depth of groove to be used even in case of slight inaccuracies in the pipe diameters.

Any desired number of keys may be used, depending upon the diameter of the pipe, from two in connection with pipes of relative small diameter, to six or eight in pipes of larger diameter.

The keys are arranged in diametrically opposed relation, and the thickness of the keys may be increased, depending upon circumstances, without increasing the depth of the grooves, which would weaken the pipe.

Since the keys take the thrust of the flanges as they are drawn toward one another by the bolts 13, it is desirable to add some thrust members in the annular spaces between the keys, which may be in the form of thrust pins 25 suitably spaced over the rear face of the ring and formed with heads 26, the rear faces of which line up with the rear faces of the keys.

In operation:

The pipe section which may have relatively unfinished ends and need not be exactly square at the ends, are first formed with the grooves 22, at the proper spacing from the ends, by means of the template hereinbefore described, and a hack saw, or similar tool.

Next, the coupling units are applied to the ends. In connection with each unit, the operator will first push the flange over the pipe section to an out-of-the-way position.

Next, he may apply the hub 6 which has the packing 9 and the ring 8 previously assembled therewith, and position the same, with the rear face of the ring registering with the forward edges of the grooves 22 and the pin holes for the pins 24 centered over the grooves.

The operator then inserts the keys into the grooves, with the front faces of the keys bearing on the rear face of the ring, and inserts the lock pins 24. Additional spacing pins 25 may then be inserted in holes provided for the same to bring their rear faces into the plane of the rear faces of the keys.

With both coupling units thus arranged on their respective pipe sections, the latter are brought into alinement, with the flange washers 5 interposed between the sections and the hubs, and the flanges are pushed toward one another to engage over the rings 18 and the keys and with the bolt holes alined, whereupon the bolts may be applied to firmly draw the bushings 16 upon the interposed flange washers.

It is not necessary, for the purposes of the present invention, that the ends of the pipe sections be exactly squared, and the operator may even cut the grooves, with the aid of his template, so that in final position, the pipe sections are slightly spaced from one another. The actual sealing takes place between the hubs and the flange washer.

Any leaks between the ends of the pipe sections are stopped by the packing 9, which protects the keys and prevents escape of fluid past the ring 18.

It is apparent that the relatively loose fit between the end of the pipe sections allows of considerable bending at the coupling, and that each pipe section is relatively free to turn, with its lock assembly, with respect to the other sections so that in an entire pipe line, each coupling has a desired degree of flexibility and each pipe section is capable of independent turning movement.

The flexibility of the coupling becomes particularly important in case of earthquake, and where there is considerable vibration in the pipe system. The revolvability of individual sections allows twisting torques to be absorbed by the sections and relieves the bolts of torques and twisting tensions, which is important since the bolts are already under tension in their normal function of drawing the coupling units toward one another.

The coupling described herein may be readily assembled and disassembled for inspection of the various parts, and for renewal of the flange washer 5.

The immediate proximity of the bolts to the hubs relieves the flanges of bending stresses, and at the same time, the nuts are readily accessible for use of any tools that happen to be available.

It should also be noted that each unit may be used independently in connection with pre-existing pipe structures, as illustrated in Figure 3. In this figure, one of my coupling units, indicated at 30, is connected to the fixed flange 31 which may represent the delivery pipe of a pumping unit or other apparatus. The unit may be coupled to the fixed unit in the manner shown, with the flange washer interposed between the unit and the pump flange.

The only prerequisite for such use is that the bolt holes must register, and this prerequisite will be met in most cases, because the bolt holes usually are spaced and arranged in accordance with standard practice.

The packing may be selected to withstand the action of any fluid that may be passed through the pipe, and the coupling may be made of any desired material, such as metal, plastic or glass.

I claim:

1. A coupling for a pair of pipe sections arranged in confronting relation, comprising a pair of hubs mounted upon the confronting ends of the pipe sections, a washer interposed between the hubs, a pair of flanges mounted upon the pipe sections rearwardly of the hubs and having rims projecting beyond the hubs, the hubs and the flanges of each section having confronting recesses to form annular chambers about the sections, rings mounted in the chambers and bearing upon the front walls thereof, a plurality of keys mounted upon the rear face of each ring in widely spaced relation and in contact with the cooperating flange, each pipe section having a plurality of limited and straight-bottom grooves positioned for the keys to engage therein, and means for drawing the rims of the flanges toward one another, whereby the hubs are forced upon the washer with a certain degree of bendability about the washer.

2. A coupling as defined in claim 1, in which the keys are narrower than the grooves to allow of a certain amount of play for augmenting the bendability of the coupling about the washer.

3. A coupling as defined in claim 1, in which the keys have means for positioning the same with respect to the grooves.

4. A coupling as defined in claim 1, in which the hubs have packing bearing against the pipe sections and the forward faces of the rings.

References Cited in the file of this patent

UNITED STATES PATENTS

| | | |
|---|---|---|
| 608,613 | Linich | Aug. 9, 1898 |
| 1,443,051 | Steindorf | Jan. 23, 1923 |
| 1,851,574 | Friederlein | Mar. 29, 1932 |
| 2,248,269 | Bilde | July 8, 1941 |
| 2,568,414 | Russ | Sept. 18, 1951 |
| 2,784,990 | Pollia | Mar. 12, 1957 |